(No Model.)

J. KENT.
THERMOMETER.

No. 456,417. Patented July 21, 1891.

Witnesses:
C. Sedgwick
E. M. Clark

Inventor:
J. Kent
By Munn & Co.
Attorneys.

UNITED STATES PATENT OFFICE.

JOSEPH KENT, OF LONDON, ENGLAND.

THERMOMETER.

SPECIFICATION forming part of Letters Patent No. 456,417, dated July 21, 1891.

Application filed January 22, 1891. Serial No. 378,658. (No model.)

*To all whom it may concern:*

Be it known that I, JOSEPH KENT, clerk, of 98 Hatton Garden, in the city of London, England, have invented a new and useful Improvement in Thermometers, of which the following is a full, clear, and exact description.

Thermometers (used for clinical, chemical, and other purposes) which have the scale marked externally upon the stem or tube are liable to have the markings of the scale defaced or destroyed by the acids to which the instrument is exposed in use or for cleaning, and the scale being on the front of the stem or tube and at a considerable distance from the mercury column the latter is obscured and the reading of the instrument is neither so easy nor so precise as is desirable.

My invention has for its object to provide such a thermometer with a scale which is indestructible and which is situated behind the mercury column, whereby the objections above mentioned are avoided.

To this end the invention consists in inserting a separately-made scale-marked strip, of enamel or other suitable material, into a second bore formed in the stem or tube, as hereinafter described, directly in rear of and preferably as close as possible to the bore containing the mercurial column.

Reference is to be had to the accompanying drawings, forming part of this specification, wherein—

Figure 1:
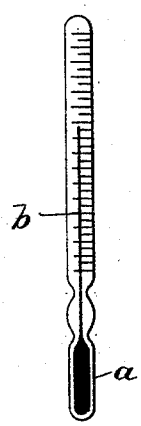
Figure 2:
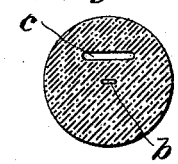
Figure 3:
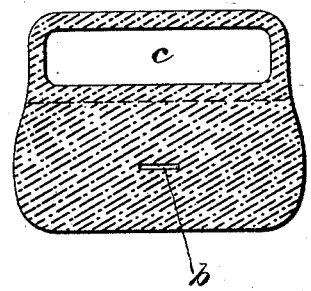
Figure 4:
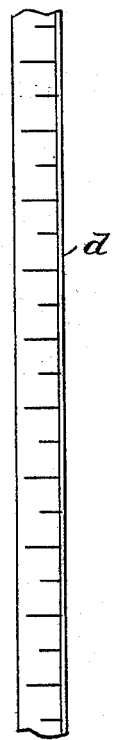

Figure 1 is a front view of a clinical thermometer constructed according to my invention. Fig. 2 is a cross-section of the thermometer-tube drawn to a larger scale, showing the position of the scale in rear of the mercurial column. Fig. 3 is a cross-section of the two tubes at the intermediate stage of manufacture before being finally "covered" and drawn out; and Fig. 4 is a face view of the scale-marked strip drawn to the same scale as Fig. 2.

The same letters of reference denote like parts in all the figures.

The thermometer is of the ordinary construction as far as the bulb $a$ and bore $b$ for the mercurial column are concerned, but it has a second bore $c$ immediately behind the bore $b$, said bore $c$ being preferably of flattened or oblong form in cross-section and of considerably greater breadth and sectional area than the bore $b$, so as to receive a scale-strip $d$, preferably of sufficient width for the graduations thereon to be perfectly visible at either side of the mercurial column.

The mode of making the double bore stem or tube required for my improved thermometer consists in blowing the "ball" for the mercurial tube in the ordinary way and on a separate blowing-iron blowing a cylinder for the scale-tube, manipulating it to the required shape, and causing it to adhere to the ball while in a semi-molten state, as shown in Fig. 3, which represents the cross-sectional forms and relative dimensions of these tubes when they are united and before they are covered and drawn. The united tubes should then be covered by dipping in molten glass and marvered, and then drawn out together to form a tube with double bore and of the ordinary cylindrical or other desired form externally. Lengths of such tube are made into thermometers in the ordinary way by forming a bulb in connection with the bore $b$ and otherwise completing the instrument in the ordinary way, so far as the thermometer proper is concerned, the end of the bore $c$ nearest the bulb being at the same time sealed while its other end is left open. The instrument having been so far completed the strip of enamel or other material $d$, which is to be scale-marked, is then "pointed" by actual reference to the mercurial column by temporarily affixing it to the front of the stem or tube and pointing it in the ordinary way of pointing scale-marked tubes. The strip, having been divided, marked, and figured, is then inserted in the special bore $c$ in its proper position with regard to the mercurial column, and is secured therein by sealing up the end of the bore and by the same means sealing the end of the scale-marked strip, so as to fix the strip (when the latter is made of enamel) to the glass tube accurately in position. The strip is thus effectually protected from injury, and the mercury column, being in front of and close to the scale, its height can be accurately read off with facility.

Having now particularly described and ascertained the nature of the said invention, and in what manner the same is to be performed, I declare that what I claim is—

1. As an improved article of manufacture, the glass thermometer-stem having a bore for the mercurial column, and a second open bore in rear of the latter for reception and protection of a scale-marked strip, as shown and described.

2. In a thermometer, the combination, with the stem or tube having a second bore in rear of the mercurial bore, of a separately-made scale-marked strip inserted into said second bore, substantially as specified.

3. In a thermometer, the combination, with the stem or tube having a second bore in rear of the mercurial bore, of a separately-made scale-marked strip of enamel inserted into said second bore and secured in proper position therein by sealing it to the glass, substantially as specified.

The foregoing specification of my improvement in thermometers signed by me this 6th day of January, 1891.

JOSEPH KENT.

Witnesses:
 WILMER M. HARRIS,
*Notary Public, 17 Gracechurch Street, London, E. C.*
 JOSEPH LAKE,
*Of same place, his Clerk.*